Patented Dec. 25, 1951

2,580,373

UNITED STATES PATENT OFFICE 2,580,373

PROCESS FOR PREPARING PERHALO-ACETYL PEROXIDE

Charles Zimmerman, Brooklyn, N. Y., assignor to the United States of America as represented by the United States Atomic Energy Commission No Drawing. Application May 17, 1948,
Serial No. 27,612

3 Claims. (Cl. 260—610)

This invention relates to polymerization promoters adapted to be used in promoting the polymerization of halogenated olefins and more particularly to a novel halogenated acetyl peroxide adapted to be used as a polymerization promoter and to a method of making such a peroxide.

In the polymerization of halogenated olefinic compounds, it is usually desirable to incorporate in the reaction mixture chemical promoters which aid in initiating, maintaining and controlling the polymerization reaction. Promoters such as organic peroxides, e. g., acetyl peroxide, benzoyl peroxide and the like have been used to promote polymerization reactions of this type. Polymerization promoters differ from catalysts in that they enter into the chemical reaction that they promote and fragments of the promoter become part of the finished polymer. Thus the chemical structure of the promoter affects, in some measure, the structure and properties of the polymer.

In recent years, there has been considerable interest in polymers formed from perhalogenated olefins such as trifluorochloroethylene and tetrafluoroethylene. Such polymers may be either liquids or solids. They have a high degree of chemical and thermal stability and are of special interest because of their unusual resistance to chemical attack by chlorine, fluorine and their compounds. It has been found, however, that when perhalogenated olefinic monomers are polymerized in the presence of organic promoters such as acetyl peroxide or benzoyl peroxide, hydrogen-containing fragments of these promoters become incorporated in the polymeric product and may affect adversely the ability of the product to withstand chemical attack by the halogens and their compounds. The presence of even a small percentage of hydrogen in the polymeric product may result in an appreciable reduction in the corrosion resistance of the polymer, particularly its resistance to elemental fluorine.

It is accordingly an object of the present invention to provide an organic peroxide promoter that is capable of promoting the polymerization of perhalogenated olefins and is at the same time completely free from hydrogen.

It is another object of the invention to provide a novel perhalogenated peroxide that is useful as a polymerization promoter.

It is still another object of the invention to provide a method for making such a peroxide.

It is a still further object of the invention to provide a perhalogenated peroxide that is especially useful in the low temperature polymerization of perhalogenated olefins to produce high molecular weight solid products, e. g., plastics.

Other objects of the invention will be in part obvious and in part pointed out hereinafter.

In accordance with the present invention a polymerization promoter is provided comprising bis-trichloro-acetyl peroxide. Since this peroxide contains no hydrogen, fragments of the promoter that may become incorporated in the polymeric product do not diminish the stability of the product and its ability to resist chemical attack by the halogens and their compounds. By using bis-trichloro-acetyl peroxide as a promoter, perhalogenated olefinic monomers can be polymerized to yield products of exceptional stability.

The bis-trichloro-acetyl peroxide of the present invention may, in general, be conveniently prepared by causing a trichloroacetic acid derivative to react with an aqueous solution of an inorganic peroxide selected from the group consisting of alkali metal and alkaline earth metal peroxides. It has been found that the bis-trichloro-acetyl peroxide tends to be unstable at ordinary room temperatures and above, and hence it is desirable, from the point of view of both safety and obtaining a satisfactory yield of the product, to carry out all steps of the process at a temperature at least as low as 0° C. and preferably below this temperature. Satisfactory yields of the product may be obtained by dissolving the inorganic peroxide in an aqueous solution of a suitable freezing point depressant and carrying out the reaction between the trichloro-derivative of acetic acid and the inorganic peroxide at a temperature between the freezing point of the solution and 0° C.

Various derivatives of acetic acid may be used in preparing the present product, among which may be mentioned trichloro-acetyl chloride and trichloro-acetic anhydride. The peroxide product is a solid material and must be maintained at relatively low temperatures, i. e., temperatures below about 0° C. in order to maintain its stability. Since the product is sensitive to shock and sometimes decomposes with explosive violence, it is important that it be stored and used at these low temperatures. In order to facilitate storage of the peroxide and its incorporation into polymerization reaction mixtures, it has been found desirable to dissolve the peroxide at the time it is prepared in a suitable halogenated organic solvent, for example, a chlorofluorinated organic solvent such as trichlorofluoromethane. The peroxide when dissolved in such a solvent to the extent of say 2% by weight can be effectively and safely stored at a reduced temperature over considerable periods of time without appreciable deterioration.

In order to point out more fully the nature of the present invention, the following specific example of an illustrative method of preparing the present peroxide is given:

About 20 gms. of sodium chloride was dissolved in 100 cc. of distilled water in a reaction flask provided with a low temperature thermometer and a high speed mechanical stirrer. The resulting brine solution which contained about 20% by weight of NaCl was cooled to about −15° C. by surrounding the flask with an alcohol-water mixture containing equal volumes of alcohol and water and chilled with dry ice to about −20° C. In this cooled brine solution 4.7 gms. of chemically pure sodium peroxide was dissolved. After the peroxide was dissolved and the temperature equilibrium re-established, 18 gms. of trichloro-acetyl chloride, which had been previously cooled to about −15° C., was added to the contents of the reaction flask and the reaction mixture stirred for about one hour while maintaining the temperature between −10° C. and −15° C.

The bis-trichloro-acetyl peroxide was thrown down as a fine flocculent precipitate and separated by filtering the reaction mixture through a Buchner funnel that had been cooled to 0° C. Upon completion of the filtration, the precipitate was washed quickly with small portions of 0° C. distilled water.

The precipitate was purified by recrystallization from trichlorofluoromethane (Freon 11) by adding the cooled solvent to the precipitate and allowing the solution to warm for a short time with stirring to dissolve the precipitate. When the resulting solution was again cooled, the perhalo peroxide crystallized out as a mass of fine fluffy lustrous crystals which were recovered as before by filtering. The yield of peroxide thus obtained represents about 50% to 80% of the amount theoretically obtainable.

As indicated above, the product of the present invention is characterized by considerable thermal instability and is capable of decomposing with explosive violence. Hence it can be safely handled only at relatively low temperatures, and careful manipulation at temperatures below 0° C. is required to prepare satisfactory yields. The product has an appreciable rate of decomposition at ordinary temperatures, and to preclude undue deterioration in storage, it is preferably dissolved in a suitable solvent such as trichlorofluoromethane and maintained at relatively low temperatures until it is to be used. A suitable storage temperature is −78° C.

The present product may be used to promote the polymerization of monomers comprising perhalogenated olefins to give either liquid or solid polymeric products that are unusually resistant to the action of chlorine, fluorine and their compounds. It is especially useful in low temperature polymerization reactions wherein high molecular weight plastics are produced. However it may also be used in other processes for producing highly resistant polymeric products.

Since many embodiments might be made of the present invention and since many changes might be made in the embodiment described, it is to be understood that the foregoing description is to be interpreted as illustrative only and not in a limiting sense.

I claim:

1. The method of making a perhalo-acetyl peroxide which comprises dissolving a peroxide selected from the group consisting of alkali metal and alkaline earth metal peroxides in an aqueous brine solution, cooling said brine solution to a temperature between its freezing point and 0° C., and adding to said solution a perhalo derivative of acetic acid while maintaining said solution at a temperature below 0° C. and above its freezing point to form said perhalo-acetyl peroxide.

2. The method of making a perhalo-acetyl peroxide which comprises dissolving a peroxide selected from the group consisting of alkali metal and alkaline earth metal peroxides in an aqueous sodium chloride solution, and mixing a perhalo derivative of acetic acid with said solution while maintaining the temperature of said solution at about −15° C. to form said perhalo-acetyl peroxide.

3. The method of making bis-trichloro-acetyl peroxide which comprises dissolving a peroxide selected from the group consisting of alkali metal and alkaline earth metal peroxides in an aqueous solution of a freezing point depressant, and adding trichloro-acetyl chloride to said solution while maintaining said solution at a temperature above its freezing point and below 0° C. to form said bis-trichloro-acetyl peroxide.

CHARLES ZIMMERMAN.

REFERENCES CITED

The following references are of record in the file of this patent:

UNITED STATES PATENTS

| Number | Name | Date |
|---|---|---|
| 1,913,775 | Straub | June 13, 1933 |
| 2,379,390 | Tuerck | June 26, 1945 |
| 2,414,769 | Rust | Jan. 21, 1947 |
| 2,439,399 | Shanley et al. | Apr. 13, 1948 |
| 2,458,207 | Rudolph et al. | Jan. 4, 1949 |
| 2,462,042 | Howald et al. | Feb. 15, 1949 |

FOREIGN PATENTS

| Number | Country | Date |
|---|---|---|
| 369,725 | Great Britain | Mar. 31, 1932 |

OTHER REFERENCES

Beilstein, 4th edition, vol. 2, page 199 (1920).

Vanino et al.: Ber., vol. 33, pages 1043 to 1045 (1900).

Price et al.: J. A. C. S., vol. 64, pages 1103 to 1106 (1942).